United States Patent [19]

Grube et al.

[11] Patent Number: 5,078,262

[45] Date of Patent: Jan. 7, 1992

[54] CONVEYOR

[75] Inventors: Erwin Grube, Bielefeld; Walter Kuhlmann, Lage; Friedhelm Elges, Bielefeld; Ralf Schneuing, Horstel, all of Fed. Rep. of Germany

[73] Assignee: Durkopp Adler Aktiengesellschaft, Fed. Rep. of Germany

[21] Appl. No.: 575,384

[22] Filed: Aug. 29, 1990

[30] Foreign Application Priority Data

Sep. 2, 1989 [DE] Fed. Rep. of Germany ....... 3929158

[51] Int. Cl.$^5$ .............................................. B65G 17/32
[52] U.S. Cl. ..................................... 198/680; 198/687.1
[58] Field of Search ............... 198/465.4, 690.2, 821, 198/687.1

[56] References Cited

U.S. PATENT DOCUMENTS

| | | | |
|---|---|---|---|
| 2,514,429 | 7/1950 | Waugh | 198/690.2 X |
| 2,774,458 | 12/1956 | Keuper | 198/680 X |
| 3,247,952 | 4/1966 | Kozlosky | 198/465.4 X |
| 3,960,264 | 6/1976 | Carbine et al. | 198/465.4 X |
| 4,465,178 | 8/1984 | Coggon | 198/690.2 |
| 4,946,023 | 8/1990 | Heinold et al. | 198/465.4 X |

FOREIGN PATENT DOCUMENTS

| | | |
|---|---|---|
| 0312721 | 4/1989 | European Pat. Off. |
| 1183021 | 12/1964 | Fed. Rep. of Germany. |
| 1229452 | 11/1966 | Fed. Rep. of Germany. |
| 1802073 | 5/1969 | Fed. Rep. of Germany. |
| 1950151 | 4/1971 | Fed. Rep. of Germany. |
| 2121087 | 12/1971 | Fed. Rep. of Germany. |
| 2737442 | 3/1977 | Fed. Rep. of Germany. |
| 3047282 | 6/1982 | Fed. Rep. of Germany. |
| 3336190 | 5/1985 | Fed. Rep. of Germany. |
| 8808642 | 10/1988 | Fed. Rep. of Germany. |
| 8905996 | 8/1989 | Fed. Rep. of Germany. |
| 1237552 | 6/1971 | United Kingdom. |

*Primary Examiner*—Joseph E. Valenza
*Assistant Examiner*—Keith L. Dixon
*Attorney, Agent, or Firm*—Ostrolenk, Faber, Gerb & Soffen

[57] ABSTRACT

A conveyor which can be used both as a storage conveyor for storing goods hanging on hangers, particularly articles of clothing, and as a feed or an oblique conveyor. A traction belt which rotates in a direction of transport grasps the hanger hooks at their tip, whereby the hangers are engaged away from their center-of-gravity line. In this way, both the loading and the delivery points of the conveyor can be developed in an operatively reliable manner. Since the traction belt, structured preferably as a toothed belt, can be supported at any desired place without preventing or impeding its transporting ability, the storage conveyor can be of any desired length. By means of a guide ledge which is formed on the base body of the conveyor and extends parallel to the direction of transport, the hangers transported are prevented from swinging out and thus sliding out of the conveyor. The particular application of the conveyor is determined by selection of the traction belt. A stop is also provided for preventing movement of hangers in the direction of transport when the conveyor is to be used as a storage conveyor.

8 Claims, 6 Drawing Sheets

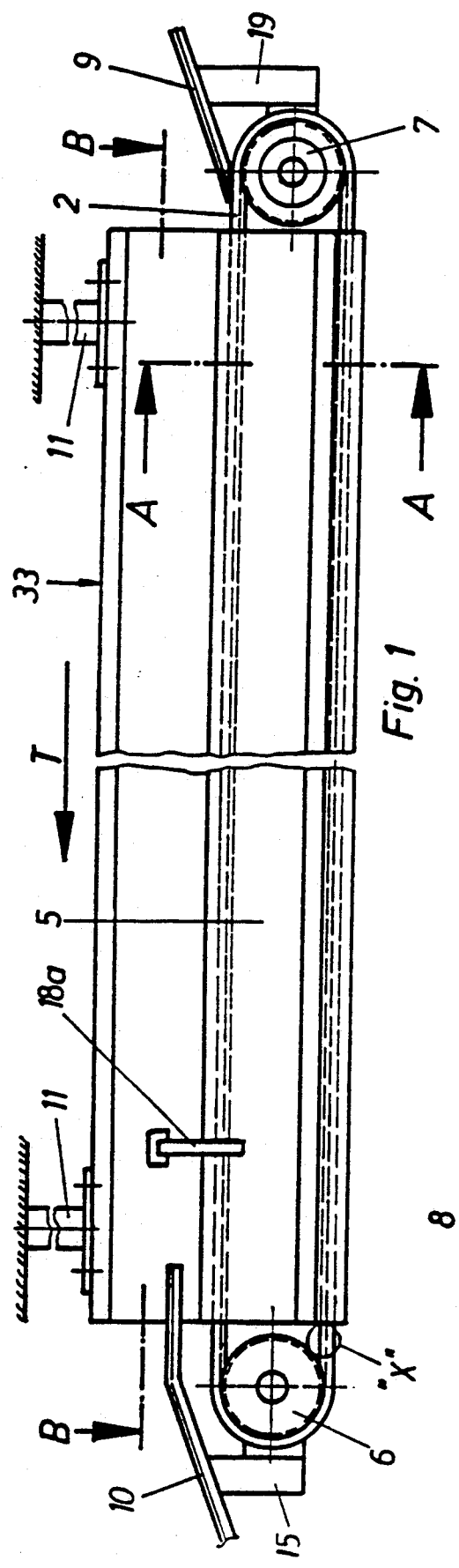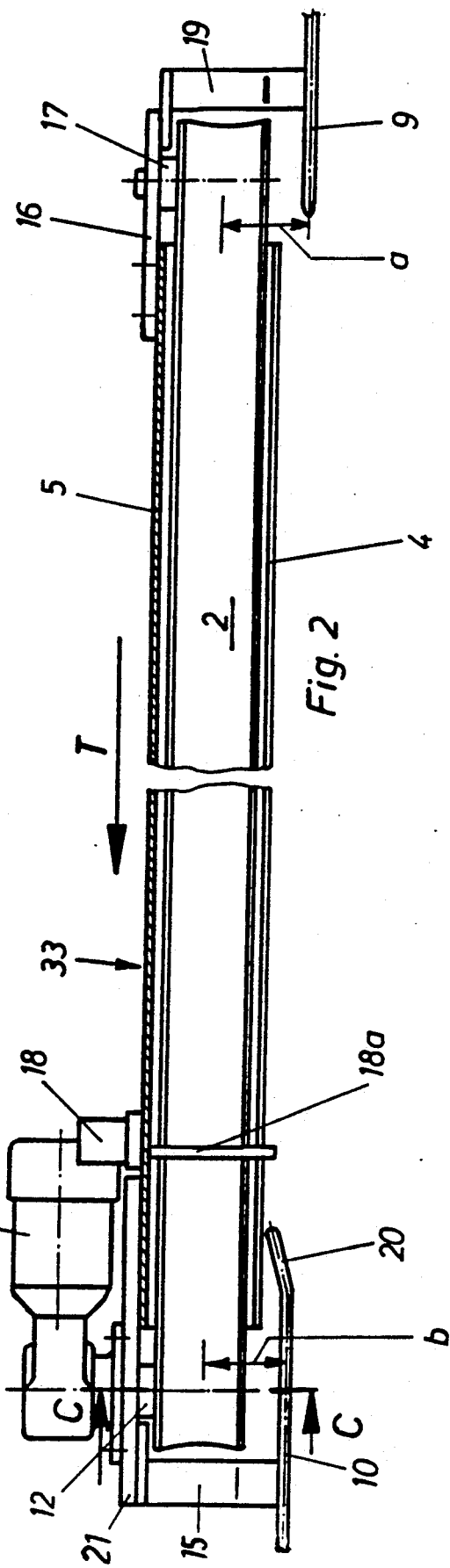

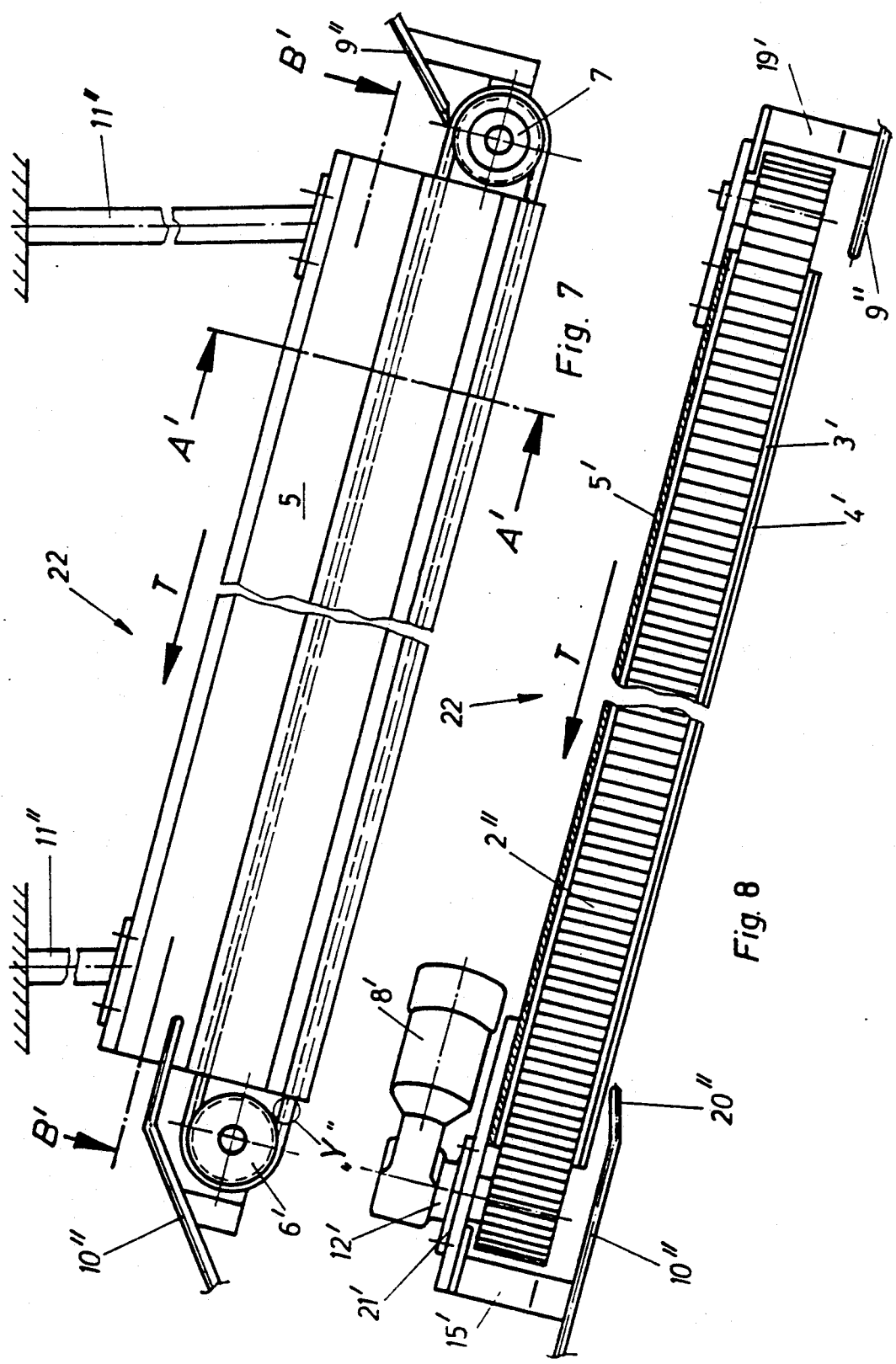

CONVEYOR

CROSS-REFERENCE TO RELATED APPLICATION

This application is related to commonlyassigned Appln. Ser No. 575,408 of Erwin Grube et al., filed on even date herewith, titled "STORAGE CONVEYOR".

BACKGROUND OF THE INVENTION

1. Field of the Invention

The present invention relates to a conveyor for transporting goods suspended from hangers

2. Background Art

Such a conveyor system, generally known as a hanging conveyor, as a rule has a main conveyor path and several side paths. The side paths can serve to store specific items or material which have been previously removed from the main conveyor path until they are required for further working or processing, whereupon they are unloaded from the side path and regrouped, or simply transported further and introduced again into the main path. Such a side path is generally known as a storage conveyor.

For this purpose it has been known for a long time to structure the side path with a gradient so that the goods hanging on the hangers can slide down a slide rail under their own weight.

A storage conveyor structured in this manner has the disadvantage, on the one hand, that the obtainable length thereof is greatly dependent on the required gradient, since the latter is limited by the existing height of the room within which the conveyor is set up. On the other hand, the slope of the gradient, particularly in the event that the material being transported is of varying weight, has a great influence on the operability of the storage conveyor. Since both light goods (for instance blouses) and heavy goods (for instance coats) are transported over the same path, a compromise must always be found when determining the gradient so as to assure that even the lightest material to be conveyed will dependably slide down.

In the case of heavy materials, such a compromise gradient then necessarily leads to considerable accumulation of pressure at the storage place, as a result of which the maximum possible storage length must be further limited. Since not only horizontal but also vertical space is necessary for storage, the room utilization ratio is poor when gradient paths are employed.

It is also known to structure the storage conveyor path as a horizontally extending rotating spindle onto which the clothes hangers are loaded by means of their hooks. By the provision of an accumulation device which extends into the direction of transport of the conveyor worm and against which the hanger hooks strike, the material being conveyed is then stored (Federal Republic of Germany Ul-88 08 642).

Due to the high weight load in the accumulation region and the frictional forces produced by the stored hangers which, upon rotation of the spindle, jump over the threads, the spindle becomes hot and expands in the horizontal direction, leading to problems at the interface with the further conveyor path adjoining the storage conveyor.

Since, furthermore, support of the spindle is possible only at its two ends, the maximum possible storage length is limited by the strength of the material of which the spindle is made and the weight of the material to be stored.

In order to overcome differences in height within a conveyor system — for instance one which runs from one floor to another, or from a working place (sewing machine) situated at a normal working height in the side path, into the main path — so-called oblique conveyors are used.

Oblique conveyors may also comprise a driven spindle (Federal Republic of Germany A-30 47 282). In such case, the thread spiral must be cut deeper in order to assure the advance and support of the hangers.

In addition to the above-mentioned disadvantages of a spindle there is the complicating factor that, since the drive must be arranged outside the region of transport, it is coupled by a universal joint to the spindle, which is technically rather expensive.

Furthermore the hanger hooks can move over one another at the loading and removal places, which can jam the material being transported.

It is also known from U.S. Pat. No. 4,736,687 to provide an oblique conveyor with a rotating strap having a driver hook (Federal Republic of Germany C-35 31 550). If such an oblique conveyor is to be used for the direct transport of clothes hangers, the structural height of the conveyor is limited by the diameter of curvature of the hook. Particularly when a heavy material is being transported, limitations on operation may then exist.

SUMMARY OF THE INVENTION

The principal object of the present invention is to improve upon conveyors of these types by developing a conveyor that can be used both as a storage conveyor and as an oblique conveyor, that can be of any desired length, that assures optimal. utilization of space, that is equally suitable for goods of different weights, and that assures dependable loading and removal of the material being transported and/or stored.

These objects are achieved by a conveyor system for transporting goods hanging on hangers, said hangers each having a hanger hook and a center-of-gravity line, comprising: traction means for transporting the hangers in a direction of transport; and means for locating the hangers so that the traction means engages the hangers substantially away from the center-of-gravity line of the hanger hook. The traction means, preferably a toothed belt, has engaging means structured and arranged for engaging the tip of a hanger hook.

An important feature of the invention is that, in contradistinction to the prior art, the hanger hooks are not engaged by traction means at their center-of-gravity line, that is, at the top region of the hook, but rather they are engaged at the tip of the hook, so that the loading and removal devices of the conveyor are enabled to be arranged parallel to the main transport unit. In this way, the hanger hooks can be engaged for being introduced into and removed from the conveyor at their center-of-gravity line, at the top region of the hook.

Because the loading and removal of hangers at the places of connection at the storage conveyor can be effected linearly (by engagement of the center-ofgravity line in the region of the top of the hanger), no disadvantageous changes in the direction of transport occur. Furthermore changes in the length of the conveyor or of its loading or delivery means caused by variations in temperature have no effect on its operability.

In combination with the loading device for so-called trolleys disclosed in Federal Republic of Germany Patent 25 37 442, loading can be effected automatically with the conveyor of the invention since the trolley can be moved parallel to the storage conveyor or an individualizing device arranged following it. The transfer is then made possible by providing a short gradient path.

Of course a horizontally guided conveyor — a so-called feeder conveyor — of any desired length can also be provided in accordance with the invention.

Since the traction means, which is preferably structured as a toothed belt, can be supported at any place without interfering with the transport of the hooks, the conveyor can be made as long as desired.

According to a particularly advantageous feature of the invention, primarily for using the invention in a storage conveyor, the toothed belt may have an upward facing fillet-shaped profile, arranged for receiving the top of a hanger hook.

Excessive forces produced by sliding friction do not result at the place of storage in the case of a storage conveyor developed in accordance with this feature, since the contact surface between the hanger tip and the traction means is very small.

A storage conveyor also preferably comprises means for obstructing movement of the hangers being transported by the traction means, such as a stop, for storing the hangers in said conveyor system.

According to another feature, the toothed belt may be toothed on both sides, which is particularly useful in connection with an oblique conveyor.

If a conveyor structured in accordance with this feature is arranged following a storage conveyor in accordance with the above description, and if the traction means of the following conveyor moves faster, then the stored hangers will be separated during their transport.

Additionally, a guide ledge may be provided on the base body and extending substantially between the toothed belt and a region of the hanger hook which is diametrically opposite the hook tip, preferably beyond the center-of-gravity line of the hanger hook, for spacing said opposite region away from said base body and thereby orienting said hook tip on said toothed belt generally toward said guide ledge. The outer edge of the guide ledge away from the toothed belt may be provided with a low-friction covering.

Other features and advantages of the present invention will become apparent from the following detailed description of two embodiments of the invention, namely a storage conveyor and an oblique conveyor, with reference to the accompanying drawings.

BRIEF DESCRIPTION OF THE DRAWINGS

FIG. 1 shows a storage conveyor with loading and delivery points, seen in side view.

FIG. 2 is a longitudinal section through the storage conveyor along the line B-B of FIG. 1.

FIG. 7 is a side view of an oblique conveyor with loading and delivery points.

FIG. 8 is a longitudinal section through the oblique conveyor along the line B'-B' of FIG. 7.

DETAILED DESCRIPTION OF THE DRAWINGS

Storage Conveyor

Figure 4:
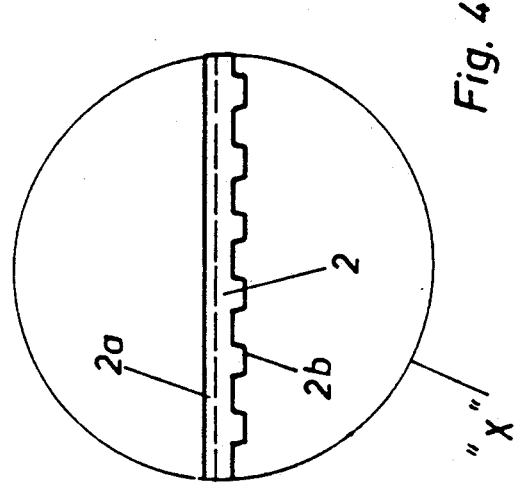
FIG. 4 shows the detail "X" of FIG. 1.

The storage conveyor 33 is integrated into the side path of a hanging conveyor and comprises a base body 5, which can be fastened to the ceiling of a room by rods 11, and traction means which is preferably structured as a toothed belt 2, sprockets 6, 7 about which the belt 2 is trained, mounted in the base body 5, a drive motor 8, a loading rail 9 and a delivery rail 10.

The drive motor 8 is flange-mounted onto the side of the base body 5 at substantially the height of the delivery rail 10, and via the drive shaft 12, drives the drive sprocket 6. The toothed belt 2 is conducted over the drive sprocket 6 and over the reversing sprocket 7 which is arranged substantially at the height of the loading rail 9. The drive sprocket 6 is driven by the drive shaft 12 of the motor 8, the drive shaft 12 being flange-mounted via the mounting part 21 on the base body 5. The reversing sprocket 7 — not shown in detail here — is mounted via the shaft 17 in the flange 16 secured to the base body 5.

Figure 3:
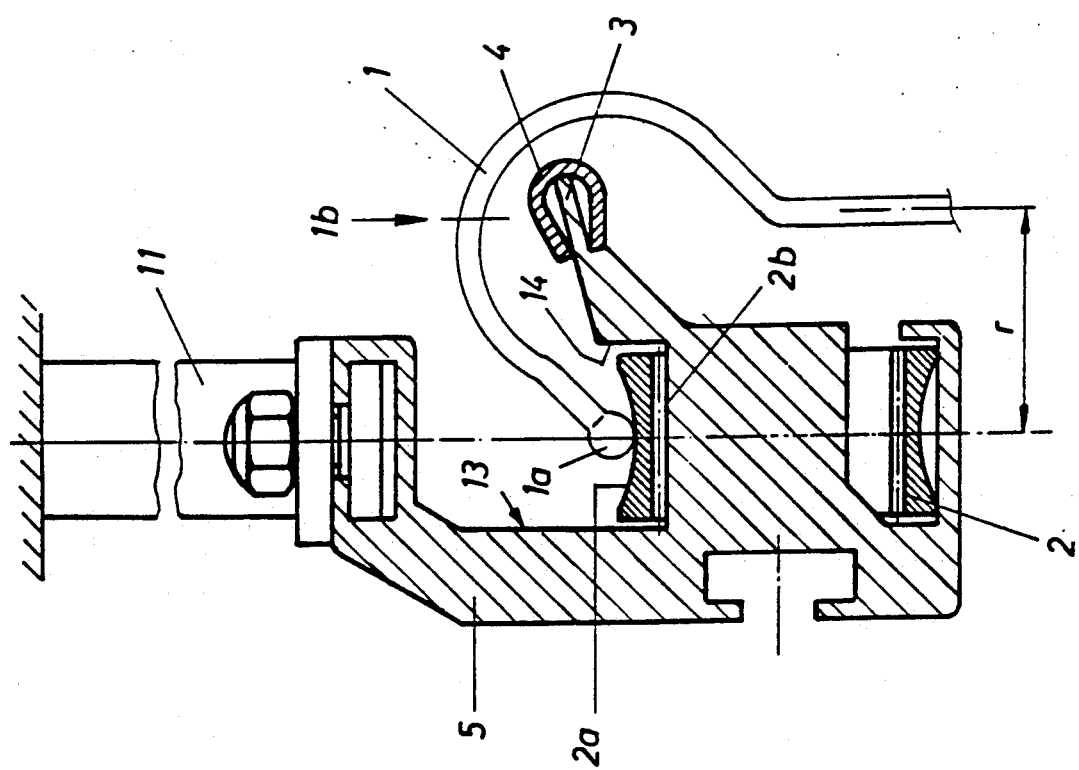
FIG. 3 is a cross-section through the storage conveyor along the line A-A of FIG. 1.

The base body 5 may advantageously have the cross-section shown in FIG. 3, the toothed belt 2 being conducted between the shoulders, 13, 14. The channel which is formed by the shoulders 13, 14 in the base body 5 is somewhat wider than the toothed belt 2, as a result of which the belt 2, is effectively prevented from slipping off of the base body 5, while at the same time damage due to rubbing of the toothed belt 2 on the shoulders 13 and 14 is avoided. Via its toothed side 2b the upper course of the revolving belt 2 lies on the base body 5 so that support of the traction means (belt 2) is possible over the entire length of the storage conveyor, and thus the direction of transport can be precisely maintained.

In advance of the delivery rail 10, as seen in the direction of transport T, a stop 18 which can be swung into the region of transport is arranged on the side of the conveyor 33, so that the hanger hooks 1 can strike against the stop 18 at the place (stop point) designated 18a, whereby individual hangers bearing the material being conveyed are pushed together for storage. In this connection it is of course selfevident that only the first hanger strikes against the stop 18 and every following hanger hook 1 strikes against the hanger directly in front of it.

Figure 5:
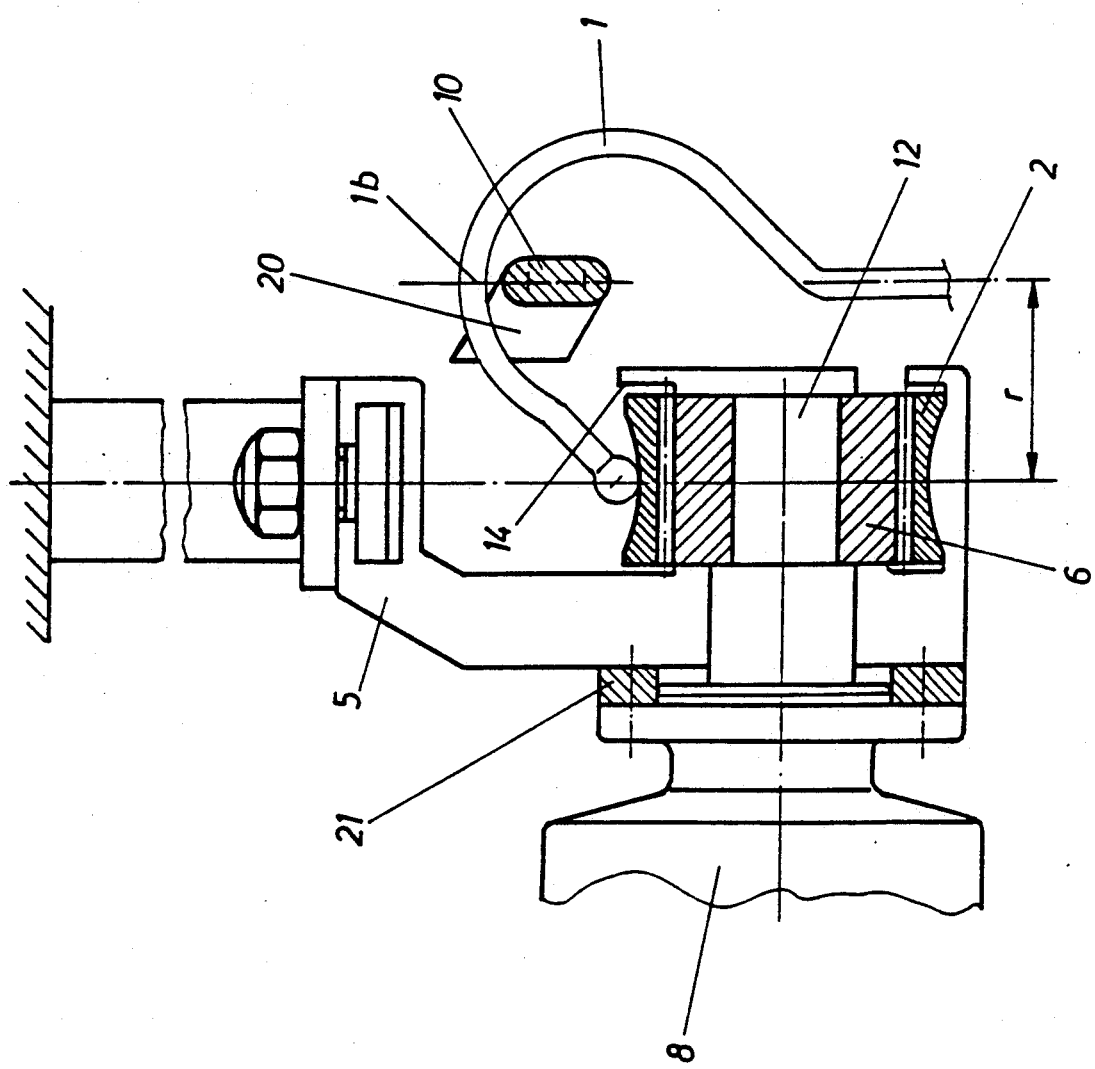
FIG. 5 is a cross-section through the storage conveyor along the line C-C of FIG. 2.

From FIG. 2 it can be noted that the loading rail 9 is shifted laterally from the base body 5. The loading rail 9 leads to the main path (not shown here) of the conveyor. The lateral displacement of the loading rail 9 from the base body 5 is so selected that the distance a from the center of the toothed belt 2 to the center of the loading rail 9 corresponds to the distance r from the hanger tip 1a to the center-ofgravity line 1b of the hanger hook 1 (See FIG. 5.) The loading rail 9 is fastened to the flange part 16 and the base body 5 by the angle plate 19.

Along the loading rail 9, which is structured with a gradient from the main path to the storage conveyor, the clothes hangers are guided by the hanger hooks 1 in the region of their center-of-gravity line 1b under the action of gravity from the main path into the storage conveyor 33. The loading rail 9 terminates shortly past the center axis of the reversing sprocket 7 (as seen in the direction of transport T), so that downward sliding hangers fall onto the toothed belt 2. The toothed belt 2 has a fillet-shaped cross-section, as shown in FIG. 3, and is arranged so that its teeth 2b are in engagement with the sprockets 6, 7, while the hanger tip 1a is guided by the upward-facing fillet-shaped portion in all cases substantially in the center of the toothed belt 2. (See FIG. 4.)

The hangers are transported on the hook tip 1a in the direction of transport T by the toothed belt 2 which is driven via the drive sprocket 6, until the hook 1 of the first hanger comes against the stop 18, at the stop point 18a, and is thereby prevented from being transported further, and the other hanger hooks are pushed up behind it.

When the desired number of clothes hangers has been stored, the drive motor 8 is disconnected. Thereafter, the hangers are transported further by turning the motor 8 on again and swinging away the stop 18. The hangers are then guided along the delivery rail 10, which is displaced laterally from the toothed belt 2 and which extends above the toothed belt 2 into the storage conveyor in the direction opposite the direction of transport T, in such a manner that the region of the center-of-gravity line 1b of the hook 1 comes to be disposed above the rail 10. (See FIG. 5.) The delivery rail 10 is rigidly fastened to the base body 5 via the angle piece 15 which is fastened on one side to the rail 10 and on the other side to the flange member 21.

The lateral offset b of the delivery rail 10, in the same way as the lateral offset a of the loading rail 9, is large enough that the distance from the center of the toothed belt 2 to the center of the delivery rail 10 corresponds to the distance r from the hanger tip 1a to the center-of-gravity line 1b of the hanger hook 1.

In order to make the transfer of the hangers to the rail 10 more dependable, the end 20 of the rail 10 which extends upstream beyond the end of the toothed belt 2 is bent laterally in the direction toward the base body 5. In this way, a hanger hook will be transferred even if it is being transported on the side of the toothed belt 2 lying closest to the shoulder 13. At a point substantially above the center axis of the drive sprocket 6, the rail 10 is bent downward as it extends further in the direction of transport T so that the transported hanger hooks 1, after they come out of engagement with the toothed belt 2, fall onto the oblique delivery rail 10 and slide down by their own weight.

The vertically upward extended shoulder 14 on the base body 5 is extended by an extension 3 (FIG. 3) which extends outward in the transport region and serves as a guide ledge. This guide ledge 3 extends so far outward that it protrudes beyond the center-ofgravity line 1b of the hanger hook 1. Accordingly, it extends between the traction means 2 and the region of the hanger hook 1 which is diametrically opposite the hanger tip 1a. (See FIG. 3.)

A slide ledge 4 of plastic is arranged on the outer end of the guide ledge 3. FIG. 3 shows that the guide ledge 3 or slide ledge 4 both prevents the hangers from swinging during transport or storage, and prevents the hanger tips 1a from coming too close to the shoulder 13 of the base body 5 when loaded. The shoulder 14 which projects vertically above the toothed belt 2 from the base body 5 prevents the hanger hook 1 from sliding off in the opposite lateral direction.

Oblique Conveyor

In order to overcome differences in height in a conveyor path, particularly for transporting hangers from a conveyor path FU of low height to a conveyor path FO of greater height, the device described above can be used with only slight modifications.

For greater clarity, those structural parts of the oblique conveyor 22 according to FIGS. 6 to 10, to be explained below, which are identical with those of the previously described storage conveyor according to FIGS. 1 to 5, have been provided with the same reference numbers, to which a prime mark (') has been added. Parts having the same function but a different structure are designated with the same number, to which two prime marks (") have been added. To this extent, what has been described above also applies in the following.

Figure 10:
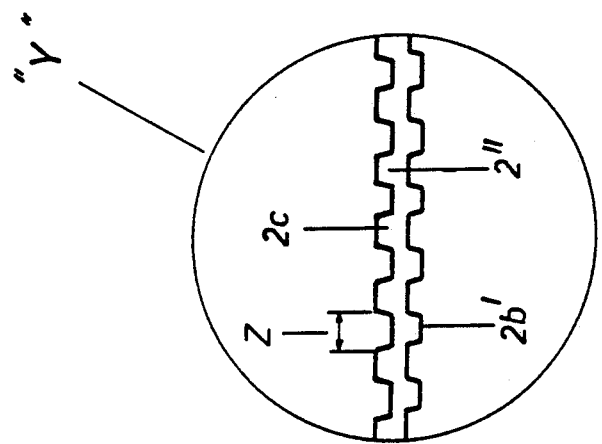
FIG. 10 shows the detail "Y" of FIG. 7
Figure 9:
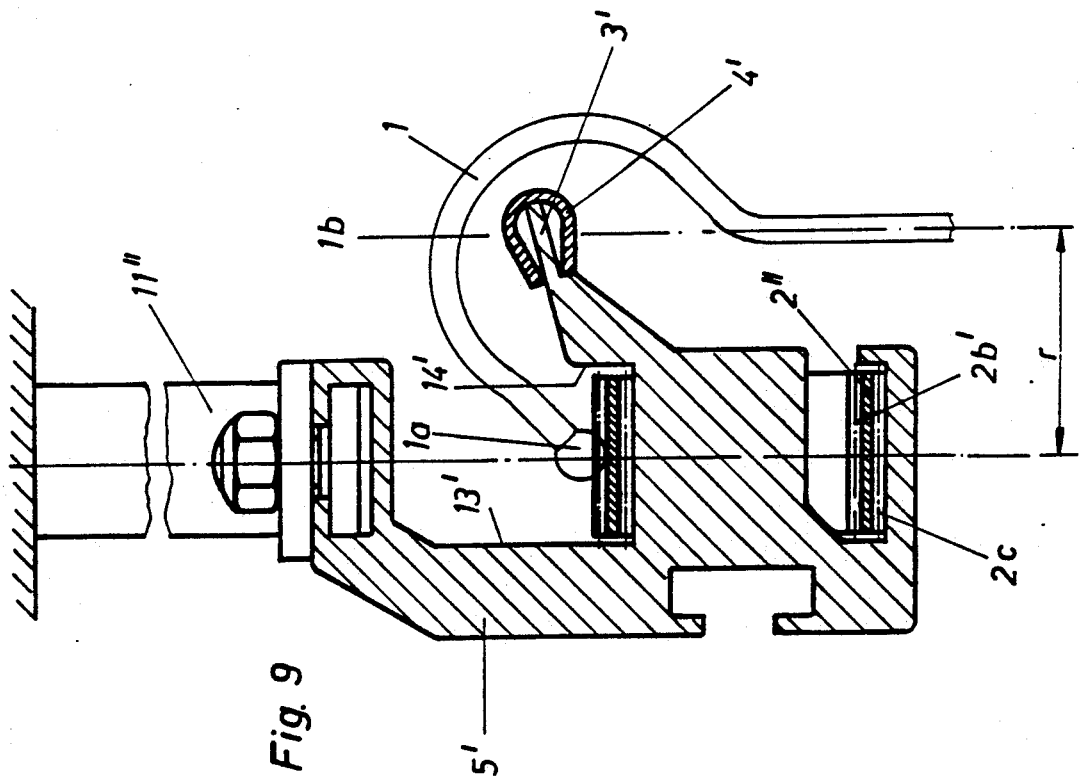
FIG. 9 is a cross section through the oblique conveyor along the line A'-A' of FIG. 7.

The base body 5' has a toothed belt 2" as shown in FIG. 10, toothed on both sides, which is driven in revolution in the manner already described by means of sprockets 6', 7'. The distance Z between the upper teeth 2c amounts to somewhat more than the diameter of the hanger-hook tip 1a of the hanger to be transported. Via the rods 11", the oblique conveyor 22 is fastened below the ceiling of the room so that the difference in height between the two conveyor paths FU, FO is bridged over.

Figure 6:
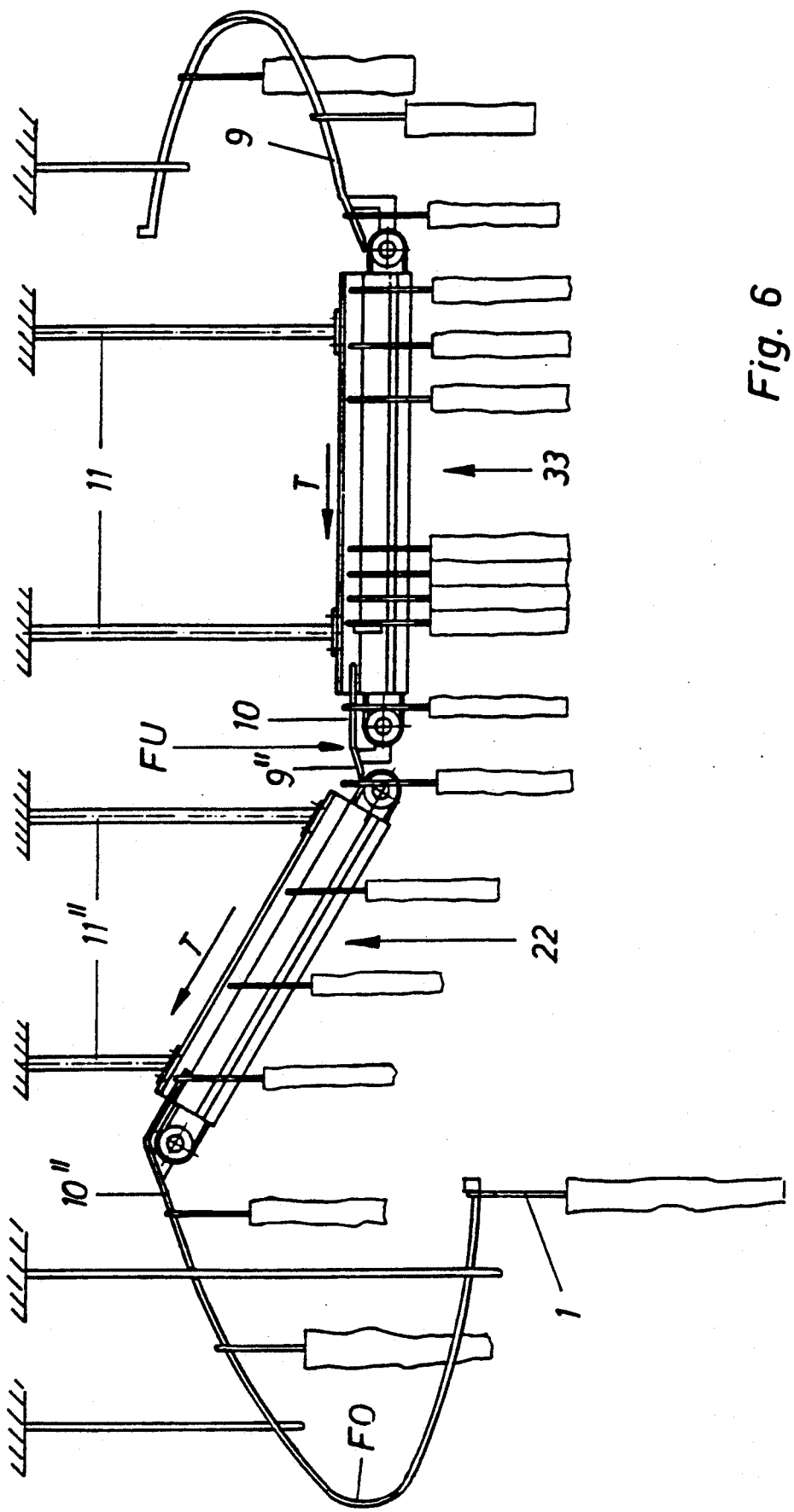
FIG. 6 is a diagrammatic partial view of a conveyor system including an oblique conveyor and a storage conveyor.

FIG. 6 diagrammatically shows the arrangement of the oblique conveyor 22 and the storage conveyor 33 within a conveyor system. The delivery rail 10 of the storage conveyor 33 passes over into the loading rail 9" of the oblique conveyor 22. As already mentioned, the hangers slide down along the rails 10, 9" in the region of the center-of-gravity line 1b of the hanger hooks 1 and at the end of the loading rail 9" drop onto the upper course of the toothed belt 2" and are carried into the oblique conveyor 22.

Here also, because of the lateral offset of the loading rail 9" with respect to the base body 5', the tips 1a of the hanger hooks 1 land within the central region of the toothed belt 2".

By the action of gravity, the hanger-hook tip 1a slides between two teeth 2c and comes to rest against the tooth flank disposed in the direction opposite the direction of transport and the hanger is conveyed upward. Upon arriving at the upper end, the hanger hook 1 is transferred to the delivery rail 20", 10". The hanger hook 1 slides with its center-of-gravity line 1b substantially on the delivery rail 10" onto the upper conveyor path FO and is transported further from there.

If the toothed belt 2" of the oblique conveyor 22 revolves faster than the toothed belt 2 of the storage conveyor 33, the hangers 1 which have been previously stored are separated in the oblique conveyor. By means of the upper teeth 2c a defined distance is furthermore maintained between the individual hanger hooks.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A conveyor system for transporting goods hanging on hangers, said hangers each having a hanger hook and a center-of-gravity line, comprising:

a base;

traction means mounted on said base for transporting the hangers in a direction of transport relative to said base; and means for locating the hangers so that an upward-facing surface of the traction means engages a tip of each hanger hook substantially away from the center-of-gravity line of the hanger;

said locating means comprising a guide ledge extending from said base and toward a portion of the hanger hook which is opposite the hook tip, such that the guide ledge does not touch the hook as long as the hook tip remains substantially centered on said traction means and said hanger hook remains substantially transverse to the direction of transport, for spacing said opposite portion away from said base and thereby orienting said hangers with respect to the base.

2. A conveyor system according to claim 1, wherein the traction means has engaging means structured and arranged for engaging the tip of a hanger hook.

3. A conveyor system according to claim 2, wherein the traction means is a toothed belt.

4. A conveyor system according to claim 3, wherein the toothed belt is toothed on both sides.

5. A conveyor system according to claim 1, wherein the guide ledge extends beyond the center-ofgravity line of the hanger hook.

6. A conveyor system according to claim 1, wherein the outer edge of the guide ledge away from the base is provided with a lowfriction covering.

7. A conveyor system according to claim 2, wherein the engaging means has an upwardly-concave fillet-shaped profile and is arranged for receiving the tip of a hanger hook.

8. A conveyor system according to claim 1, further comprising means for obstructing movement of the hangers being transported by the traction means, for storing the hangers in said conveyor system.

* * * * *